United States Patent Office 3,137,662
Patented June 16, 1964

3,137,662
PRE-MIX FOR USE IN PREPARING A POLY-URETHANE RESIN FOAM
Gerald W. Recktenwald, Louisville, Ky., assignor to General Electric Company, a corporation of New York
No Drawing. Filed Mar. 7, 1962, Ser. No. 177,970
3 Claims. (Cl. 260—2.5)

The present invention relates to a method of preparing polyurethane foams and is more particularly concerned with the preparation of polyurethane foams employing trichloromonofluoromethane as a blowing or cell forming agent.

Polyurethane foams produced by reacting high molecular weight polyethers or polyesters containing reactive hydroxy groups with diisocyanates using trichloromonofluoromethane as the blowing or expanding agent are well known in the art. Because of their lower water sensitivity and lower thermoconductivity, the polyurethane foams made by reacting polyethers with organic diisocyanates are generally preferred for use as refrigerator and freezer insulating materials.

Examples of suitable diisocyanates employed in making such foams are:

Tolylene diisocyanate:
p,p'-Diisocyanate diphenyl methane;
Naphthalene 1,5-diisocyanate;
Metaphenylene diisocyanate;
Bitolylene diisocyanate;
Hexamethylene diisocyanate; and
Durene diisocyanate.

Various high molecular weight hydroxy polyethers or polyols are employed in the manufacture of the foams, the selection depending upon the physical and chemical characteristics desired in the final foam. Examples of polyethers which can be employed in the manufacture of polyurethane resins are the polyalkylene ether glycols such as the mixed poly glycols of ethylene-propylene, polypropylene glycol, polyethylene glycol, polytrimethylene ether glycol, polytetramethylene ether glycol and various mixtures thereof. For the more rigid foams it is desirable that the polyether have a relatively high hydroxyl number or in other words be characterized by the presence of a plurality of secondary hydroxyl groups.

The strength and rigidity of polyurethane foams generally depend upon the amount of cross linking obtained by the reaction of the hydroxy and isocyanate groups during the resin forming reaction. In accordance with one method of increasing the cross linkage when polyethers are reacted with various organic polyisocyanates, polyols having higher hydroxyl numbers than the available polyethers are frequently included in the reaction mixture. A particularly useful additive for this purpose is N,N,N',N'-tetrakis (2-hydroxypropyl) ethylenediamine. This polyol not only contains four hydroxyl groups to give multiple cross linking sites but also contains two tertiary nitrogen atoms which provide catalysis for the reaction of the polyether with the isocyanate. Another tertiary amine compound containing five reactive hydroxyl groups suitable for this purpose is the polyhydroxyalkylamine sold under the trade name Niax Pentol LA-700 by Union Carbide Chemicals Company and having the following structural formula:

For control purposes, in the preparation of polyether based foams, the isocyanate or a prepolymer of the isocyanate and a portion of the polyether reactant is combined with a premix of the remaining materials, which premix is frequently referred to as an "activator." In the practice of the present invention it contains the remaining portions of the polyether, an amine catalyst which may be a highly functional polyhydroxy amine of the type referred to hereinbefore, a surfactant and the foaming material, trichloromonofluoromethane. Since an exothermic reaction takes place immediately upon mixing of the diisocyanate or the partial prepolymer thereof with the polyether reactant and catalyst, the mixture is immediately introduced into a mold or other structure in which the material is allowed to foam and set.

In the large scale production of foam products it is the usual practice to prepare substantial quantities of the activator premix which is stored until required. However it has been found that this activator premix containing the polyether reactant, the trichloromonofluoromethane and the catalyst tends to "age" during storage and this aging reaction results in a foam which is slow in curing, soft and subject to shrinkage when cooled for example to 0° F. While the nature of this aging reaction is not fully known, it has been noted that the presence of the polyhydroxyalkylamine such as the N,N,N',N'-tetrakis (2-hydroxypropyl) ethylenediamine accelerates this aging reaction perhaps due to its basic catalytic nature or perhaps because the hydroxyl groups contained therein are more reactive than those in the polyether. The aging reaction does appear to involve both the reactive OH groups present in either this ingredient or in the polyether component and the trichloromonofluoromethane and it is possible that other ingredients present in the activator may have a catalytic effect and also accelerate the reaction.

Whatever the nature of this aging reaction, the present invention is based on the discovery that the addition of a tertiary acetylenic alcohol of the general formula:

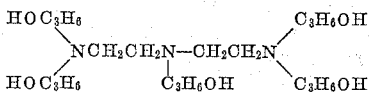

wherein R is a methyl or ethyl group has a significant inhibiting effect on the aging reaction. The addition of as little as 0.1 to 1.0 percent by weight of 2-methyl-3-butyn-2-ol, hereinafter referred to as methyl butynol, based on the concentration of the trichloromonofluoromethane has been found to significantly increase the pot or storage life of the activator mixture. Equivalent amounts of 3-methyl-1-pentyn-3-ol (methyl pentynol) may be substituted for the methyl butynol.

The following is an example of the application of the present invention to the "prepolymer method" of preparing a polyurethane foam in which the diisocyanate is first reacted with a portion of the polyether before mixing with the activator premix. The activator premix was made in accordance with the following formulation in which all parts are by weight:

74 parts Niax triol LK–380 [1]
1 part X–520 (L–520) Surfactant [2]
35 parts of the N,N,N',N'-tetrakis (2-hydroxypropyl) ethylenediamine
0.4 part tetramethyl butanediamine
0.1 part dibutyl tin-dilaurate

[1] A mixture of (a) the propylene oxide adduct of tris(hydroxy-phenyl)propane having a hydroxy number of 250 and (b) the propylene oxide adduct of glycerine having a hydroxyl number of 633, in the proportion such that the hydroxyl number of the mixture is 380. Further, the triol has an average molecular weight of 440 and a specific gravity at 20° C. of 1.114.
[2] A polysiloxane-polyoxy-alkylene block copolymer prepared in accordance with the disclosure in U.S. Patent No. 2,834,748.

A mixture of these ingredients was mixed with trichloromonofluoromethane in the proportions of 35.5% by weight of the trichloromonofluoromethane and 64.5 parts by weight of the mixture. Two samples of the resultant activator premix were taken. Sample 1 was used as control. To sample 2 there was added 0.5% by weight of methyl butynol. Both samples were allowed to stand side-by-side at room temperature for 31 days.

To test the effectiveness of the inhibitor the following experiment was performed:

105 grams of a prepolymer of 258 parts tolylene diisocyanate, 100 parts Niax triol (LHT-240) (the triol reaction product of 1,2,6-hexanetriol and propylene oxide and which may contain some mono and dipropylene adducts and having a hydroxyl number of 240, manufactured by Union Carbide) and 17.9 parts 1,2,6-hexanetriol were mixed with 100 grams of the sample 1 and with 100 grams of the inhibited sample 2. The properties of the resultant mixtures were as follows:

|                     | Sample 1        | Sample 2         |
|---------------------|-----------------|------------------|
| Gel time            | 2 min., 10 sec. | 1 min., 35 sec.  |
| Rise time for foam  | 5 min.          | 3 min., 30 sec.  |
| Friability time     | 20 min.         | 8 min., 0 sec.   |

Friability time is the time required for a foam to become powdery after the liquid reactants are mixed. When a finger nail or a dull test instrument is scraped lightly over the foam, one first observes a rubbery texture. Then as the curing progresses, the surface becomes powdery and small particles of urethane resin lightly adhere to the test instrument.

The above results may be compared with the properties of the reaction mixture of the same freshly prepared activator premix and the same prepolymer. It had a gel time in the neighborhood of 1 minute 19 seconds; a rise time of 3 minutes 3 seconds and a friability time of 6 minutes 45 seconds.

Thus it will be seen that the addition of the inhibitor to the activator substantially improves its shelf life. As a result production specifications can be met with inhibited activator premixes stored for substantially longer periods of time than with activator premixes which do not include the inhibitor.

It will be understood that the particular formulation shown and described and the particular procedure set forth in connection therewith are merely for purposes of explanation and illustration and that various modifications can be made without departing from the scope of the invention.

What I claim as new and desire to secure by Letters Patent of the United States is:

1. A premix for use in preparing a polyurethane resin foam by the addition to said premix of an organic polyisocyanate, said premix including a hydroxy polyether polyol reactant adapted to react with said polyisocyanate to form a polyurethane resin, a poly(hydroxyalkyl) polyamine containing from four to five hydroxyl groups, trichloromonofluoromethane, and a small amount of tertiary actylenic alcohol selected from the group consisting of methyl butynol and methyl propynol for inhibiting aging of the premix prior to addition of said polyisocyanate.

2. A premix for use in preparing a polyurethane resin foam by the addition to said premix of an organic diisocyanate, said premix including a hydroxy polyether polyol adapted to react with said diisocyanate to form a polyurethane resin, N,N,N',N'-tetrakis (2-hydroxypropyl) ethylenediamine, trichloromonofluoromethane, and from 0.1 to 1% by weight of methyl butynol, based on the weight of said trichloromonofluoromethane, for inhibiting aging of the premix prior to addition of said diisocyanate.

3. A polyether polyol premix for the preparation of a polyether polyol-polyisocyanate-polyurethane resin foam by addition to said premix of an organic polyisocyanate adapted to react with said polyether polyol to form a polyurethane resin, said premix comprising said polyether polyol, trichloromonofluoromethane, a poly (hydroxyalkyl) polyamine selected from the group consisting of N,N,N',N'-tetrakis (2-hydroxypropyl) ethylenediamine and a polyamine of the formula:

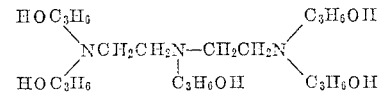

and, as a stabilizer for said premix, from 0.1 to 1.0 percent by weight, based on the weight of the trichloromonofluoromethane, of methyl butynol.

References Cited in the file of this patent
UNITED STATES PATENTS

| 2,981,759 | Cole et al. | Apr. 25, 1961 |
| 3,072,582 | Frost | Jan. 8, 1963 |
| 3,085,116 | Kvalnes | Apr. 9, 1963 |